United States Patent
Mizuno et al.

(10) Patent No.: US 6,726,594 B2
(45) Date of Patent: Apr. 27, 2004

(54) CONTROL SYSTEM AND METHOD FOR VEHICLE HAVING CONTINUOUSLY VARIABLE TRANSMISSION

(75) Inventors: Makoto Mizuno, Nagoya (JP); Kazuhisa Mogi, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/198,994

(22) Filed: Jul. 22, 2002

(65) Prior Publication Data

US 2003/0022753 A1 Jan. 30, 2003

(30) Foreign Application Priority Data

Jul. 26, 2001 (JP) ........................................ 2001-226728

(51) Int. Cl.$^7$ ............................................... B60K 41/12
(52) U.S. Cl. ........................................... 477/37; 477/43
(58) Field of Search .............................. 477/37, 43, 44; 701/54, 102, 110

(56) References Cited

U.S. PATENT DOCUMENTS

| | | | |
|---|---|---|---|
| 5,545,106 A | * 8/1996 | Senger et al. ................. | 477/43 |
| 6,066,070 A | 5/2000 | Ito et al. | |
| 6,148,257 A | * 11/2000 | Katakura et al. .............. | 701/54 |
| 6,181,020 B1 | * 1/2001 | Uchida et al. ............ | 290/40 C |
| 6,324,456 B2 | * 11/2001 | Bosse .......................... | 701/54 |
| 6,401,022 B2 | * 6/2002 | Kubota et al. ................ | 701/54 |

FOREIGN PATENT DOCUMENTS

| | | |
|---|---|---|
| EP | 0 352 110 A2 | 1/1990 |
| JP | A-7-280052 | 10/1995 |
| JP | A 2000-289496 | 10/2000 |
| WO | WO 99/65722 | 12/1999 |

* cited by examiner

*Primary Examiner*—Ankur Parekh
(74) *Attorney, Agent, or Firm*—Oliff & Berridge, PLC

(57) ABSTRACT

A control system for a vehicle in which an internal combustion engine whose output torque is controlled based on a required output power is coupled to a continuously variable transmission whose input rotation speed is controlled based on the required output power. A controller of the system determines a final target operating point of the engine which is defined by the output torque and the input rotation speed, on the basis of the required output power, and sets a transient operating point to one of possible operating points that can be achieved within a predetermined period of time such that the operating point of the engine approaches the final target operating point. The controller then controls the output torque and the input rotation speed of the continuously variable transmission so as to operate the engine at the set transient operating point.

14 Claims, 5 Drawing Sheets

CONTROL SYSTEM AND METHOD FOR VEHICLE HAVING CONTINUOUSLY VARIABLE TRANSMISSION

INCORPORATION BY REFERENCE

The disclosure of Japanese Patent Application No. 2001-226728 filed on Jul. 26, 2001 including the specification, drawings and abstract is incorporated herein by reference in its entirety.

BACKGROUND OF THE INVENTION

1. Field of Invention

The invention relates to control system and method for a vehicle including a continuously variable transmission coupled to an output side of an internal combustion engine, such as a gasoline engine or a diesel engine, and more particularly to system and method for controlling the output power of the internal combustion engine when a request for an increase of the power is made.

2. Description of Related Art

In recent years, continuously variable transmissions have been widely used as transmissions of vehicles. The continuously variable transmission is capable of changing the speed ratio continuously, and therefore is able to precisely control the engine speed as an input rotation speed of the transmission. Also in recent years, the throttle opening, fuel injection quantity, and supercharging can be electrically controlled. Thus, by using the continuously variable transmission to control the engine speed while electrically controlling the engine load, it is possible to operate the an internal combustion engine in a desirable operating state (an operating point) which provides the best fuel efficiency or minimized fuel consumption.

One example of a control system for an internal combustion engine of the above type coupled to a continuously variable transmission is disclosed in Japanese Laid-Opened Patent Publication No. 2000-289496. In the control system disclosed in this publication, a target driving force is first determined on the basis of a required output power as represented by an accelerator pedal position (i.e., an amount of depression of an accelerator pedal) and the vehicle speed detected at the time of the control (which will be referred to as "current vehicle speed"). A target output power is then determined on the basis of the determined target driving force and the current vehicle speed. In accordance with the determined target output power, on one hand, a target engine speed that will provide the best fuel efficiency is determined based on a map prepared in advance, and the speed ratio of the continuously variable transmission is controlled so as to achieve the target engine speed. On the other hand, a target output torque is determined in accordance with the target output power and the target engine speed, and the engine load is controlled so as to achieve the target output torque.

According to the above-described control, the internal combustion engine is maintained in an operating state which provides the best fuel efficiency. With this control in which an importance is given to the fuel efficiency, the driving force is not immediately increased when the accelerator pedal is pressed down by a large degree, resulting in deterioration of an acceleration response. In the control system as disclosed in the above publication, therefore, when a large output power is required, the engine torque and engine speed are controlled in the following manner, for example. Namely, the engine torque is first increased to the maximum level (WOT). After the target output power is reached, the engine torque and the engine speed are controlled so as to bring the operating state of the engine to a final target operating point (which is determined based on the required output power) that lies on an optimum fuel efficiency curve, while maintaining the achieved output power.

FIG. 5 shows changes or movements of the operating point of the engine during the control as described above. FIG. 5 indicates equi-fuel-efficiency lines, an equi-power line on which the output power of the engine is equal, and an optimum fuel efficiency curve, by using the engine speed and torque as parameters. In FIG. 5, "$P_1$" represents an operating state of the internal combustion engine in which the engine speed is at the lower limit value, for example, when the engine is in an idling state. When a request for increased output power is made at P1, for example, when an accelerator pedal (not shown) is depressed by a large degree while the engine is at the operating point P1, an operating point P4 on the optimum fuel efficiency curve is determined as the final target operating point on the basis of the required output power. As described above, an acceleration response may deteriorate if the operating state of the engine is controlled so as to change along the optimum fuel efficiency curve. Upon receipt of a request for acceleration, therefore, the engine torque is initially controlled to the upper limit value so that the operating point of the engine reaches P2 as shown in FIG. 5.

While the engine torque cannot exceed the upper limit value, the vehicle speed gradually increases and shifting (downshift) occurs due to the increased engine torque, whereby the engine speed gradually increases. In this process, the operating point shifts along a curve representing the upper limit values of the engine torque. When the operating state of the engine has reached a point (denoted by P3 in FIG. 5) at which the curve representing the upper limit values of the engine torque and the equi-power line passing through the final target operating point intersect, the engine speed and the engine torque are changed toward the final target operating point P4 along the equi-power line.

When a large output power is demanded, the difference between the current torque at the operating point P1 and the upper limit torque at the operating point P2 is large and the difference between the engine speed at the operating point P1 and that at the final target operating point P4 is also large. When the difference in the engine torque is large, it takes some time to change the engine torque from the operating point P1 to the operating point P2 due to a delay in an increase of the engine torque which unavoidably arises for a mechanical reason, or the like.

The above-described situation may also occur with an internal combustion engine including a turbocharger. More specifically, as shown in FIG. 6, the boost pressure of the turbocharger starts increasing immediately after the accelerator pedal is depressed (at point t1) and continues to increase gradually until it reaches the target boost pressure at point t2 after a certain period of time. This time period is a delay time generally called "turbo lag." In the internal combustion engine including the turbocharger, therefore, it takes some time for the engine torque to reach the upper limit value due to the turbo lag.

In the meantime, the rate of change of the speed ratio of the continuous variable transmission has the upper limit, as schematically shown in FIG. 7. More specifically, the rate of increase of the speed ratio, or the shift speed, is limited by mechanical or structural conditions of, for example, a hydraulic system. Also, since the rotation speed of certain rotating members change with the speed ratio, the rate of change of the speed ratio is limited by the inertial force which arises upon a change of the rotation speed. With the shift speed thus limited, it takes some time to change the engine speed from the operating point P2 to the operating point P3 or to the final target operating point P4.

In sum, when the vehicle is to be accelerated, the known system initially performs control for increasing the engine torque with a response delay, while keeping a constant engine speed. Subsequently, the system performs shift control (i.e., control of the speed ratio of the CVT) with a response delay, while keeping the engine torque at the upper limit value. Finally, the engine torque and engine speed are controlled along the equi-power line passing the final target operating point. Thus, the delays in the controls for increasing the engine toque and increasing the engine speed amount to a total delay that occurs at the time of the acceleration. Due to the acceleration delay, an acceleration response has not been sufficiently improved, though there is room for further improvement.

SUMMARY OF THE INVENTION

It is one object of the invention to provide a control system for a vehicle, which is capable of achieving a desired output power appropriately in response to a request for an increase in the output power.

To accomplish the above and/or other object(s), there is provided according to one aspect of the invention a control system for a vehicle in which an internal combustion engine whose output torque is controlled based on a required output power is coupled to a continuously variable transmission whose input rotation speed is controlled based on the required output power. A controller of the control system determines a final target operating point of the internal combustion engine which is defined by the output torque and the engine speed, on the basis of the required output power, sets a transient operating point of the engine to one of possible operating points that can be achieved within a predetermined period of time such that the operating point of the engine approaches the final target operating point, and controls the output torque and the input rotation speed of the continuously variable transmission so as to operate the internal combustion engine at the set transient operating point.

In the control system constructed as described above, when there is a demand for an increase of the output power of the engine, the final target operating point, which is defined by the output torque and the engine speed, is determined based on the required output power. If the final target operating point cannot be reached within a predetermined period of time, the engine is controlled to a transient operating point. The transient operating point is a predetermined operating point which is selected from possible operating points that can be reached within the predetermined period of time, and which is closer to the final target operating point than the current operating point. Then, the output torque of the engine and the engine speed to be established by the CVT are controlled so as to coincide with the transient operating point. Thus, both of the engine torque and the engine speed are changed at the same time toward the final target operating point, and therefore the operating state of the engine can be changed so as to achieve the required output power with high accuracy, even in the presence of a delay in a change of at least one of the engine torque and the engine speed.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Figure 4:
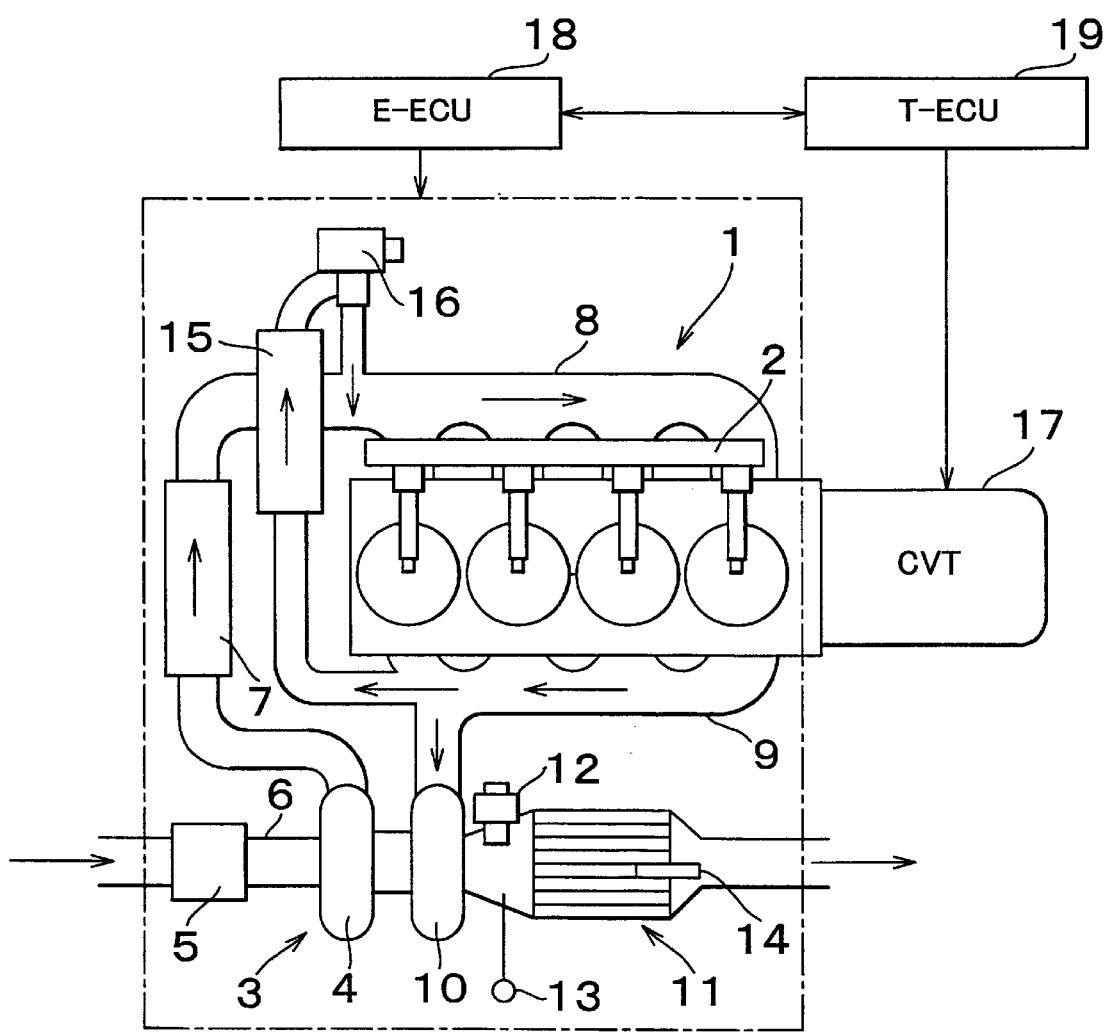
FIG. 4 is a view schematically showing a power train of a vehicle including an internal combustion engine in which a control system according to the invention is employed.

Hereinafter, one exemplary embodiment of the invention will be described with reference to the accompanying drawings. First, an internal combustion engine and a transmission of a vehicle including a control system according to the embodiment of the invention will be described. The internal combustion engine installed in the vehicle is a power unit, such as a diesel engine or a gasoline engine, which generates power by burning fuel. As schematically shown in FIG. 4, for example, an in-cylinder fuel injection engine 1 (which will be simply referred to as "engine 1") capable of injecting fuel directly into cylinders and of electrically controlling the throttle opening is used as a power source of the vehicle. The engine 1 is provided with an electronically controlled fuel injection system 2 for injecting fuel directly into the cylinders. The electronically controlled fuel injection system 2 may have a known construction or structure.

Also, the engine 1 as shown in FIG. 4 is provided with an exhaust turbine-type supercharger or exhaust turbocharger 3. An intake pipe 6 is connected to an intake port of a compressor 4 of the turbocharger 3 via an air cleaner 5. On the other hand, an intake manifold 8 is connected to a discharge port of the compressor 4 via an intercooler 7 for reducing the temperature of the intake air.

Also, an exhaust manifold 9 communicating with the respective cylinders is connected to an inlet of a turbine 10 of the turbocharger 3. In addition, a catalytic converter 11 including an exhaust purification catalyst is connected to an outlet of the turbine 10. An air-fuel ratio sensor 12 and a pressure sensor 13 for detecting the pressure of the exhaust flowing into the catalytic converter 11 are disposed upstream of the catalytic converter 11. A temperature sensor 14 for detecting the catalyst temperature is also provided. Thus, an exhaust passage extends from the exhaust manifold 9 to a release opening (not shown) that is open to the atmosphere through the catalytic converter 11. With this arrangement, the turbocharger 3 operates to increase the boost pressure in accordance with the quantity of the exhaust emitted from the engine 1, namely, in accordance with the operating state of the engine 1.

The engine 1 as shown in FIG. 4 further includes an exhaust gas recirculation system for reducing NOx in the exhaust gas. More specifically, the exhaust manifold 9 and the intake manifold 8 are connected to each other one another via an EGR cooler 15 for cooling the exhaust to be recirculated and an EGR valve 16 which is operated to control start and stop of the recirculation and to maintain a constant recirculation rate (EGR rate).

A continuously variable transmission (CVT) 17 is coupled to an output side of the engine 1. The CVT 17 is a transmission capable of changing the speed ratio continuously, and may be in the form of a belt-and-pulley type CVT or a traction type (toroidal type) CVT.

Also, there is provided an electronic engine control unit (E-ECU) 18 for electronically controlling the fuel injection quantity, injection timing, start and stop of exhaust recirculation, opening angle of a throttle valve (not shown), and so on, in the engine 1. An electronic transmission control unit 19 (T-ECU) is also provided for controlling the continuously variable transmission 17. Each of the electronic control units 18, 19 includes a microcomputer as its main component, and is arranged to control the throttle opening and/or fuel injection quantity (namely, engine load), stop and start of the engine 1, the speed ratio of the CVT 17 (namely, engine speed) and so on, on the basis of the required output power (or required acceleration quantity), vehicle speed, engine coolant temperature, oil temperature of the CVT 17, detection signals from the respective sensors 12, 13, and 14, on and off signals of a brake system, on and off signals of an ignition key (IG), and so on.

In the engine 1 as described above, the fuel is injected into the cylinders, and is burnt therein to generate mechanical energy that provides driving force. The quantity of fuel consumed for generation of the driving force is controlled to be a minimum quantity required for achieving the required output power. During operations of the engine 1, pollutants, such as NOx, generated when fuel is burnt in the cylinders are adsorbed and stored in the catalyst of the catalytic converter 11. Before the catalyst becomes saturated with the stored pollutants, the quantity of fuel in the exhaust gas is increased to produce a reducing atmosphere, in order to reduce nitrate nitrogen stored in the catalyst into nitrogen gas and release the nitrogen gas. Namely, a recovery operation is performed for recovering the purifying capability of the catalyst.

The engine 1 is basically controlled according to the required output power while achieving the highest fuel efficiency or best fuel economy. One example of the control of the engine 1 will be briefly described. First, a target driving force is determined on the basis of the accelerator pedal position indicating the required output power and the vehicle speed. A target output power is then determined on the basis of the determined target driving force and the vehicle speed. On one hand, a target engine speed (a target input rotation speed) is then determined on the basis of the target output power. For example, the target engine speed may be determined in the following manner: an engine speed at which each output power is generated with the smallest fuel consumption (or highest fuel efficiency) is determined in advance and a map indicating the relationship between the engine speed and the output power is prepared in advance. Then, a target engine speed is determined based on the target output power and the map. Subsequently, the speed ratio of the CVT 17 is controlled so as to achieve the target engine speed. The speed ratio control may be carried out through first-order lag feedback control based on, for example, a difference between the target input rotation speed and the current input rotation speed.

On the other hand, the target engine torque is determined on the basis of the target output power and the target engine speed. Then, the engine load (i.e., throttle opening or fuel injection quantity) is controlled so as to produce the target engine torque.

Figure 1:
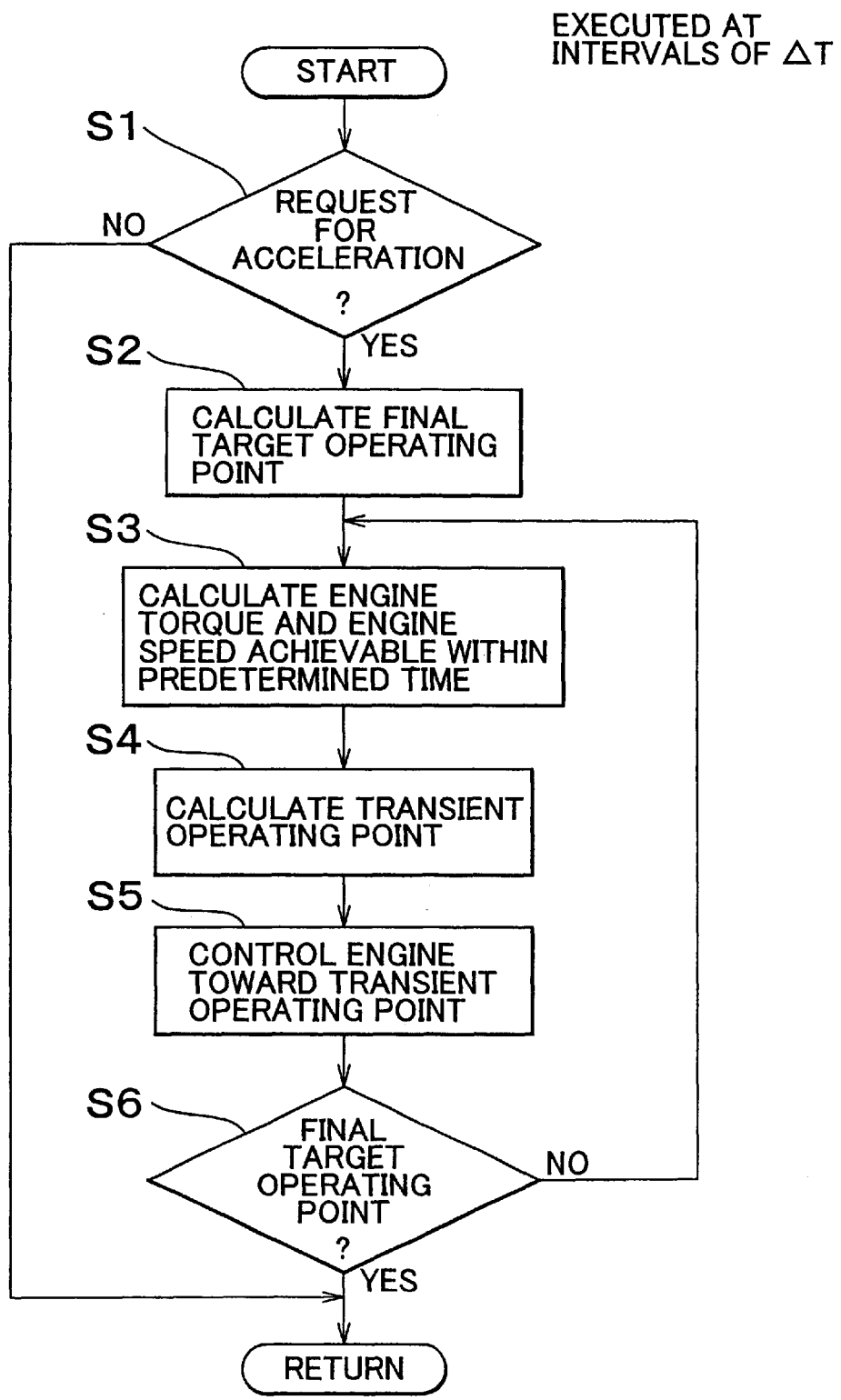
FIG. 1 is a flowchart showing one example of a control routine executed by a control system according to one embodiment of the invention.

The above-described controls of the speed ratio and engine load are also performed in the same manner when an acceleration is demanded, such as when the accelerator pedal (not shown) is pressed down. However, if the required output power is large as in the case where shifting (a speed ratio change) occurs along with supercharging, a control as described below is performed in order to prevent a deterioration in the acceleration response resulting from delays in the boost pressure increases and in the speed ratio changes. FIG. 1 is a flowchart showing one example of the control in question. The control shown in FIG. 1 is repeatedly executed at intervals of a predetermined short time Δt.

In the routine as shown in FIG. 1, it is first determined in step S1 whether an acceleration of the vehicle is demanded or requested. This determination may be made based on a signal associated with an increase of the throttle opening or the fuel supply quantity (fuel injection quantity). For example, it is determined whether the rate of change of the accelerator pedal position (or depression amount) is greater than a predetermined reference value. If the rate of change of the accelerator pedal position is greater than the reference value, it is determined that an acceleration is demanded.

If it is determined in step S1 that no acceleration demand is present, the control returns. If it is determined in step S1 that an acceleration of the vehicle is demanded, on the other hand, the final target operating point of the engine is calculated based on the required output power as represented by the accelerator pedal position, or the like, in step S2. This calculation is carried out under the above-described normal control based on the required output power. More specifically, the target driving force is first calculated from the accelerator pedal position and the vehicle speed. Then, the target output power is determined on the basis of the target driving force. Further, the input rotation speed, i.e., the engine speed, at which the target output power can be generated with the minimum fuel consumption (or highest fuel economy) is calculated. On the other hand, the target torque is determined on the basis of the target output power and engine speed. The above-indicated final target running point of the engine 1 is an operating point (an operating state) of the engine 1 that is defined by the determined target engine speed and target torque.

Next, step S3 is executed to calculate the ranges of the engine torque and the engine speed which can be achieved within a predetermined time measured from the current point of time (namely, at the next moment). Here, since the magnitude of the engine torque and its changes greatly depend upon the intake air quantity and the fuel supply quantity, they are greatly influenced by a delay in the boost pressure increase. The amount of change in the engine torque within the above-described predetermined time can be determined in advance based on experiments, or the like, and a map indicating the relationship between the amount of change of the engine torque and other parameters may be prepared. According to this map, the range of the torque achievable within the predetermined time can be determined.

Alternatively, the above-indicated range of the engine torque achievable within the predetermined time can be calculated based on the degree of an increase in the boost pressure at the current point of time according to the following expression (1), by way of example. In the following expression (1), "T" represents torque, "GA" represents air flow rate, "k" is a coefficient, "n" represents the present control time, and "n+1" represents the next control time.

$$T_{n+1}=T_n+k*(GA_n-GA_{n-1}) \quad (1)$$

Also, the engine speed achievable within the predetermined time is limited by the rate or speed of change of the speed ratio of the CVT 17. Therefore, the engine speed achievable within the predetermined time can be determined according to a map prepared in advance by obtaining the rate of change of the speed ratio of the CVT 17 in relation to various parameters. In this map, the current speed ratio, the current engine speed, and the like, may be used as parameters.

In the case of a belt-and-pulley type CVT in which the speed ratio is changed by changing the groove width of a pulley by a hydraulic pressure, the rate of change of the speed ratio is influenced by the control hydraulic pressure for controlling the speed ratio and the engine speed. Thus, the speed ratio that can be achieved within the predetermined time may be first determined, and the engine speed that can be achieved within the predetermined time may be estimated based on the achievable speed ratio. The achievable speed ratio can be calculated according to the following expression (2), by way of example. In the following expression (2), "P" represents the hydraulic pressure for controlling the CVT 17, "Ne" represents the current engine speed, "k" is a coefficient, and "n" represents the control time.

$$(\text{Speed Ratio})_{n+1}=(\text{Speed Ratio})_n+k*Ne*P \quad (2)$$

Next, in step S4, a transient operating point that is closer to the final target operating point than the current operating point is established within the range defined by the achievable engine torque and the achievable engine speed obtained in step S3. The transient operating point is an operating point set in the course of reaching the final target operating point determined based on the required output power. Namely, the transient operating point is a transient, provisional target operating point. The transient operating point may be set as desired within the above-described range of the achievable engine torque and speed as long as the transient operating point is closer to the final target operating point than the current operating point.

Figure 2:
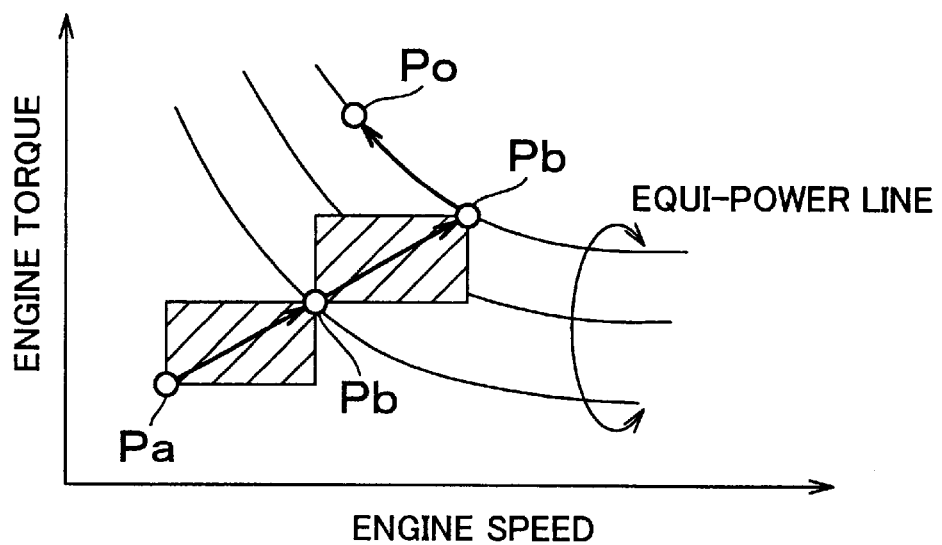
FIG. 2 is a graph showing one example of a manner of setting transient operating points.

Hereinafter, one example of the manner of setting the transient operating point will be described. As shown in FIG. 2, the above-described range defined by the achievable engine torque and the achievable engine speed has a rectangular shape in the Cartesian coordinate system having the engine torque and the engine speed as parameters. The current operating point Pa is located at the bottom left corner of the rectangular region, as shown in FIG. 2. Then, a transient operating point Pb may be set at the top right corner of the region that is located diagonally opposite to the operating point Pa. With the transient operating point thus established, the engine torque and the engine speed are increased to the maximum levels within the above-described achievable range. With the engine torque and the speed ratio thus increased, the driving torque can be rapidly increased, and consequently good acceleration performance can be realized. In some cases, however, the operating point of the engine may reach a point that is located on an equi-output curve that passes a final target operating point Po but deviates from the final target running point Po. In such a case, the engine torque and the engine speed (or the speed ratio of the CVT 17) are controlled along the equi-output curve so as to reach the final target operating point Po.

Figure 3:
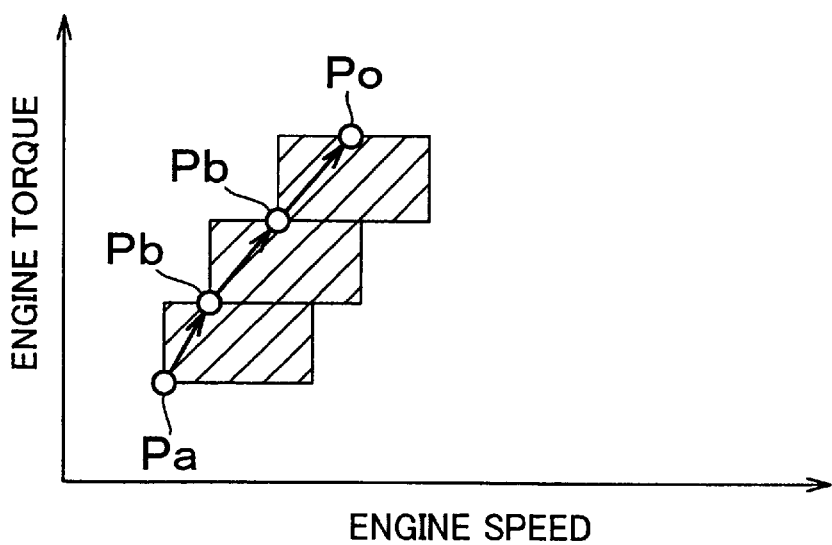
FIG. 3 is a graph showing another manner of setting transient operating points.

Alternatively, the transient operating point Pb may be set to an operating point that lies on a line connecting the current operating point Pa and the final target operating point Po within the above-described range of the achievable engine torque and engine speed, as shown in FIG. 3. With the transient operating point thus established, the engine torque and the engine speed (or the speed ratio) change straight toward the final target operating point, resulting in a smooth change in the driving force and improved shift feeling.

After setting the transient operating point in the above-described manner in step S4, the engine torque (or the engine load) and the engine speed (or the speed ratio of the CVT) are controlled to those at the transient operating point. Subsequently, it is determined in step S6 whether the operating point thus achieved is the final target operating point. If it is determined in step S6 that the operating state of the engine 1 has not yet reached the final target operating point, the control returns to step S3 to set a new transient operating point with respect to the current operating point. Then, the engine torque and the engine speed are controlled toward the new transient operating point. When the final target operating point is reached after repeating the control routine of FIG. 1, a positive determination (YES) is made in step S6 and the routine as shown in FIG. 1 is finished.

Figure 5:
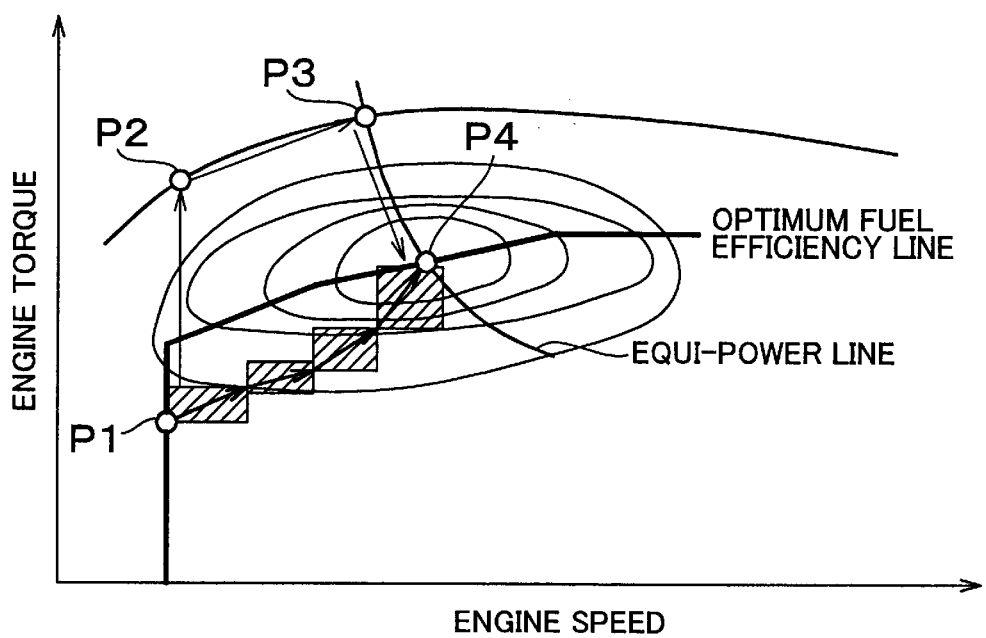
FIG. 5 is a graph indicating operating points of the internal combustion engine as represented by the engine torque and the engine speed.
Figure 6:
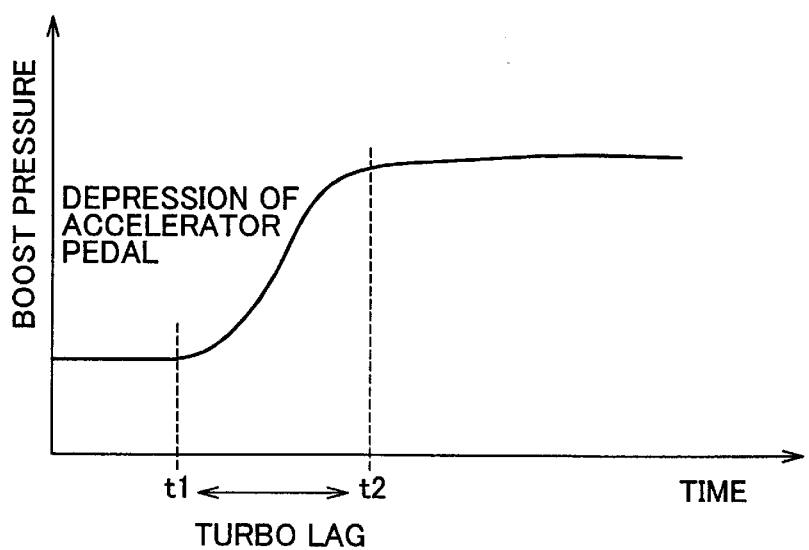
FIG. 6 is a graph useful for explaining turbo lag.
Figure 7:
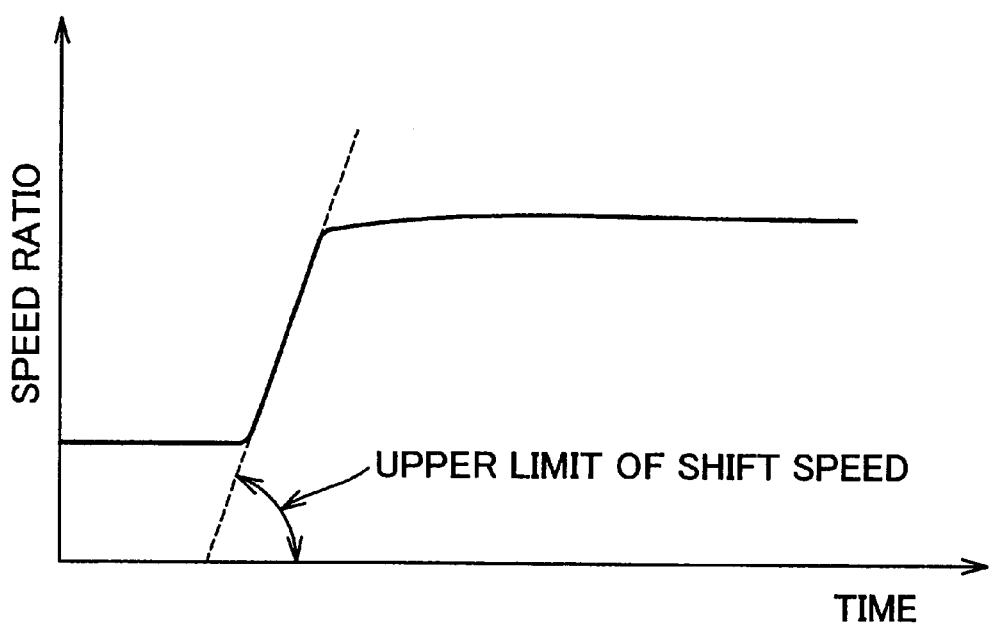
FIG. 7 is a graph useful for explaining shift speed or rate of change of the speed ratio.

FIG. 5 also shows changes in the engine torque and engine speed when the control according to the routine of FIG. 1 is performed. With the control as described above, even when a delay(s) unavoidably occurs in the control of the engine torque, boost pressure, or the engine speed, or in the rate of change of the speed ratio, a transient target operating point is set to a certain operating point within the range of the engine torque and speed that can be achieved even in the presence of such delay(s). Then, the thus determined transient operating point is updated sequentially until it reaches the final target operating point. Thus, the acceleration characteristic can be continuously optimized within the range involving the above-described delays, and can be also modified so as to achieve good acceleration feeling. Consequently, the control of the engine 1 and the CVT 17, namely, the control of the vehicle, can be performed in response to the power requirement with high accuracy.

It is to be understood that the invention is not limited to the above-described embodiment and its construction. For example, the transient operating point may be determined while giving more weight to the fuel efficiency. Also, the invention may be applied to a control system for a vehicle including an internal combustion engine with no supercharger as a power source. The invention may be also applied to a control system for a vehicle including an internal combustion engine and an electric motor as its power sources.

What is claimed is:

1. A control system for a vehicle in which an internal combustion engine whose output torque is controlled based on a required output power is coupled to a continuously variable transmission whose input rotation speed is controlled based on the required output power, comprising a controller that:

determines a final target operating point of the internal combustion engine which is defined by the output torque and the input rotation speed, on the basis of the required output power;

sets a transient operating point of the engine to one of possible operating points that can be achieved within a predetermined period of time such that the transient operating point is closer to the final target operating point than the current operating point of the engine; and controls the output torque and the input rotation speed of the continuously variable transmission so as to operate the internal combustion engine at the set transient operating point; wherein:

the internal combustion engine includes a turbocharger; and the controller sets the transient operating point on the basis of a delay in an increase in a boost pressure of the turbocharger and a delay in a change of a speed ratio of the continuously variable transmission.

2. A control system for a vehicle in which an internal combustion engine whose output torque is controlled based on a required output power is coupled to a continuously variable transmission whose input rotation speed is controlled based on the required output power, comprising a controller that:

determines a final target operating point of the internal combustion engine which is defined by the output torque and the input rotation speed, on the basis of the required output power;

sets a transient operating point of the engine to one of possible operating points that can be achieved within a predetermined period of time such that the transient operating point is closer to the final target operating point than the current operating point of the engine; and controls the output torque and the input rotation speed of the continuously variable transmission so as to operate the internal combustion engine at the set transient operating point; wherein:

the controller sets the transient operating point on the basis of a delay in a change of a speed ratio of the continuously variable transmission.

3. A control system for a vehicle in which an internal combustion engine whose output torque is controlled based on a required output power is coupled to a continuously variable transmission whose input rotation speed is controlled based on the required output power, comprising a controller that:

determines a final target operating point of the internal combustion engine which is defined by the output torque and the input rotation speed, on the basis of the required output power;

sets a transient operating point of the engine to one of possible operating points that can be achieved within a predetermined period of time such that the transient operating point is closer to the final target operating point than the current operating point of the engine; and controls the output torque and the input rotation speed of the continuously variable transmission so as to operate the internal combustion engine at the set transient operating point; wherein:

the controller sets the transient operating point to one of possible operating points which is reached when the largest amounts of changes occur in the output torque and the input rotation speed within the predetermined period of time.

4. The control system according to claim 1, wherein the controller sets the transient operating point to one of possible operating points which is reached when the largest amounts of changes occur in the output torque and the input rotation speed within the predetermined period of time.

5. The control system according to claim 1, wherein the controller sets the transient operating point to one of possible operating points which is closest to the final target operating point.

6. The control system according to claim 1, wherein the possible operating points are determined based on the output torque and the input rotation speed that can be achieved within the predetermined period of time.

7. A method of controlling a vehicle in which an internal combustion engine whose output torque is controlled based on a required output power is coupled to a continuously variable transmission whose input rotation speed is controlled based on the required output power, comprising the steps of:

determining a final target operating point of the internal combustion engine which is defined by the output torque and the input rotation speed, on the basis of the required output power;

setting a transient operating point of the engine to one of possible operating points that can be achieved within a predetermined period of time such that the transient operating point is closer to the final target operating point than the current operating point of the engine; and controlling the output torque and the input rotation speed of the continuously variable transmission so as to operate the internal combustion engine at the set transient operating point; wherein:

the internal combustion engine includes a turbocharger; and the transient operating point is set on the basis of a delay in an increase in a boost pressure of the turbocharger and a delay in a change of a speed ratio of the continuously variable transmission.

8. A method of controlling a vehicle in which an internal combustion engine whose output torque is controlled based on a required output power is coupled to a continuously variable transmission whose input rotation speed is controlled based on the required output power, comprising the steps of:

determining a final target operating point of the internal combustion engine which is defined by the output torque and the input rotation speed, on the basis of the required output power;

setting a transient operating point of the engine to one of possible operating points that can be achieved within a predetermined period of time such that the transient operating point is closer to the final target operating point than the current operating point of the engine; and controlling the output torque and the input rotation speed of the continuously variable transmission so as to operate the internal combustion engine at the set transient operating point; wherein:

the transient operating point is set on the basis of a delay in a change of a speed ratio of the continuously variable transmission.

9. A method of controlling a vehicle in which an internal combustion engine whose output torque is controlled based on a required output power is coupled to a continuously variable transmission whose input rotation speed is controlled based on the required output power, comprising the steps of:

determining a final target operating point of the internal combustion engine which is defined by the output torque and the input rotation speed, on the basis of the required output power;

setting a transient operating point of the engine to one of possible operating points that can be achieved within a predetermined period of time such that the transient operating point is closer to the final target operating point than the current operating point of the engine; and controlling the output torque and the input rotation speed of the continuously variable transmission so as to operate the internal combustion engine at the set transient operating point; wherein:

the transient operating point is set to one of possible operating points which is reached when the largest amounts of changes occur in the output torque and the input rotation speed within the predetermined period of time.

10. The method according to claim 7, wherein the transient operating point is set to one of possible operating points which is reached when the largest amounts of changes occur in the output torque and the input rotation speed within the predetermined period of time.

11. The method according to claim 7, wherein the transient operating point is set to one of possible operating points which is closest to the final target operating point.

12. The method according to claim 7, wherein the possible operating points are determined based on the output torque and the input rotation speed that can be achieved within the predetermined period of time.

13. The control system according to claim 1, wherein if an acceleration demand is present the output torque and the input rotation speed of the continuously variable transmission are controlled so as to operate the internal combustion engine at the transient operating point set by the controller, and if no acceleration demand is present, the output torque and the input rotation speed are not controlled so as to operate the internal combustion engine at the transient operating point set by the controller.

14. The method according to claim 7, wherein if an acceleration demand is present, the output torque and the input rotation speed of the continuously variable transmission are controlled so as to operate the internal combustion engine at the transient operating point set, and if no acceleration demand is present, the output torque and the input rotation speed are not controlled so as to operate the internal combustion engine at the transient operating point set.

* * * * *